(12) United States Patent
Delmonico et al.

(10) Patent No.: US 7,902,990 B2
(45) Date of Patent: Mar. 8, 2011

(54) BATTERY AND POWER MANAGEMENT FOR INDUSTRIAL INSPECTION HANDSET

(75) Inventors: James J. Delmonico, Baldwinsville, NY (US); Thomas W. Karpen, Skaneateles, NY (US); Joseph V. Lopez, Camillus, NY (US); Richard A. Monroe, Syracuse, NY (US); Joshua Lynn Scott, Jordan, NY (US)

(73) Assignee: GE Inspection Technologies, LP, Lewistown, PA (US)

( * ) Notice: Subject to any disclaimer, the term of this patent is extended or adjusted under 35 U.S.C. 154(b) by 551 days.

(21) Appl. No.: 11/925,056

(22) Filed: Oct. 26, 2007

(65) Prior Publication Data

US 2009/0109045 A1    Apr. 30, 2009

(51) Int. Cl.
G08B 21/00 (2006.01)
G08B 1/08 (2006.01)
A61B 1/04 (2006.01)

(52) U.S. Cl. ............ 340/636.1; 340/636.19; 340/539.11; 600/109

(58) Field of Classification Search .................. 340/500, 340/501, 505, 539.11, 657, 693.1, 693.5, 340/636.1–636.9; 324/426, 432, 433, 434, 324/437, 435; 600/101, 109
See application file for complete search history.

(56) References Cited

U.S. PATENT DOCUMENTS

| | | | |
|---|---|---|---|
| 4,693,110 A * | 9/1987 | Juengel | .......................... 73/1.81 |
| 4,700,693 A | 10/1987 | Lia et al. | |
| 4,727,859 A | 3/1988 | Lia | |
| 4,733,937 A | 3/1988 | Lia et al. | |
| 4,735,501 A | 4/1988 | Ginsburgh et al. | |
| 4,787,369 A | 11/1988 | Allred, III et al. | |
| 4,790,294 A | 12/1988 | Allred, III et al. | |
| 4,794,912 A | 1/1989 | Lia | |
| 4,796,607 A | 1/1989 | Allred, III et al. | |
| 4,853,774 A | 8/1989 | Danna et al. | |
| 4,862,253 A | 8/1989 | English et al. | |

(Continued)

FOREIGN PATENT DOCUMENTS

EP    1633029 A    3/2006

(Continued)

*Primary Examiner* — Jennifer Mehmood
(74) *Attorney, Agent, or Firm* — Global Patent Operation; Mark A. Conklin

(57) ABSTRACT

An industrial inspection handset is disclosed, comprising a battery assembly for providing power to the handset, wherein the battery assembly comprises a connector for connecting a battery charger, a battery circuit for communicating with a processor in the handset, and a battery charge indicator on the surface of the battery assembly connected to the battery circuit for providing a visual indication of the charge remaining in the battery assembly. A method of power management for an industrial inspection handset is also disclosed comprising the steps of setting a first maximum power output value for the camera illumination for the insertion, monitoring an imager signal processor, to determine that the gain value of the image signal processor is less than a predetermined gain value, and setting a lower second maximum power output value for the camera illumination in order to increase the gain value. Additional methods of power management for an industrial inspection handset are disclosed, comprising the steps of setting a first maximum power output value for the articulation of the insertion tube attached to the handset, monitoring the operator controls to determine that there has been no articulation for a first predetermined amount of time, monitoring the position of the insertion tube to determine whether the insertion tube position is inside or outside of a predetermined zone of coordinates, and reducing or turning off the articulation power to hold the position of the insertion tube.

20 Claims, 5 Drawing Sheets

U.S. PATENT DOCUMENTS

| | | | |
|---|---|---|---|
| 4,887,154 A | 12/1989 | Wawro et al. | |
| 4,909,600 A | 3/1990 | Ciarlei et al. | |
| 4,913,369 A | 4/1990 | Lia et al. | |
| 4,941,454 A * | 7/1990 | Wood et al. | 600/149 |
| 4,941,456 A | 7/1990 | Wood et al. | |
| 4,980,763 A | 12/1990 | Lia | |
| 4,989,581 A | 2/1991 | Tamburrino et al. | |
| 4,998,182 A | 3/1991 | Krauter et al. | |
| 5,018,436 A | 5/1991 | Evangelista et al. | |
| 5,018,506 A | 5/1991 | Danna et al. | |
| 5,019,121 A | 5/1991 | Krauter | |
| 5,047,848 A | 9/1991 | Krauter | |
| 5,052,803 A | 10/1991 | Krauter | |
| 5,061,995 A | 10/1991 | Lia et al. | |
| 5,066,122 A | 11/1991 | Krauter | |
| 5,070,401 A | 12/1991 | Salvati et al. | |
| 5,114,636 A | 5/1992 | Evangelista et al. | |
| 5,140,975 A | 8/1992 | Krauter | |
| 5,191,879 A | 3/1993 | Krauter | |
| 5,202,758 A | 4/1993 | Tamburrino | |
| 5,203,319 A | 4/1993 | Danna et al. | |
| 5,275,152 A | 1/1994 | Krauter et al. | |
| 5,278,642 A | 1/1994 | Danna et al. | |
| 5,293,156 A * | 3/1994 | Shoji et al. | 340/636.1 |
| 5,314,070 A | 5/1994 | Ciarlei | |
| 5,323,899 A | 6/1994 | Strom et al. | |
| 5,339,799 A * | 8/1994 | Kami et al. | 600/117 |
| 5,345,339 A | 9/1994 | Knieriem et al. | |
| 5,347,989 A | 9/1994 | Monroe et al. | |
| 5,365,331 A | 11/1994 | Tamburrino et al. | |
| 5,373,317 A | 12/1994 | Salvati et al. | |
| D358,471 S | 5/1995 | Cope et al. | |
| 5,435,296 A | 7/1995 | Vivenzio et al. | |
| 5,633,675 A | 5/1997 | Danna et al. | |
| 5,701,155 A | 12/1997 | Wood et al. | |
| 5,721,934 A | 2/1998 | Scheurich | |
| 5,734,418 A | 3/1998 | Danna | |
| 5,754,313 A | 5/1998 | Pelchy et al. | |
| 5,857,963 A | 1/1999 | Pelchy et al. | |
| 5,969,320 A * | 10/1999 | Leeper et al. | 235/380 |
| 6,083,152 A | 7/2000 | Strong | |
| 6,084,380 A | 7/2000 | Burton | |
| 6,097,848 A | 8/2000 | Salvati | |
| 6,191,554 B1 * | 2/2001 | Nakane et al. | 320/114 |
| 6,468,201 B1 | 10/2002 | Burdick | |
| 6,483,535 B1 | 11/2002 | Tamburrino et al. | |
| 6,494,739 B1 | 12/2002 | Vivenzio et al. | |
| 6,538,732 B1 | 3/2003 | Drost et al. | |
| 6,554,765 B1 | 4/2003 | Yarush et al. | |
| 6,590,470 B1 | 7/2003 | Burdick | |
| 6,830,545 B2 | 12/2004 | Bendall | |
| 6,847,394 B1 | 1/2005 | Hansen et al. | |
| 6,950,030 B2 * | 9/2005 | Kovarik et al. | 340/636.1 |
| 6,953,432 B2 | 10/2005 | Schiefer | |
| 7,048,686 B2 | 5/2006 | Kameya et al. | |
| 7,089,780 B2 * | 8/2006 | Sunshine et al. | 73/23.2 |
| 7,134,993 B2 | 11/2006 | Lia et al. | |
| 7,170,677 B1 | 1/2007 | Bendall et al. | |
| 7,176,656 B2 * | 2/2007 | Feldmann | 320/114 |
| 7,262,797 B2 | 8/2007 | Weldum et al. | |
| 7,295,129 B2 * | 11/2007 | Eisenson | 340/636.1 |
| 7,541,937 B2 * | 6/2009 | Groh et al. | 340/573.3 |
| 7,649,337 B2 * | 1/2010 | Uehlein-Proctor et al. | 320/112 |
| 2002/0018142 A1 | 2/2002 | Oda | |
| 2003/0212308 A1 | 11/2003 | Bendall | |
| 2004/0183900 A1 | 9/2004 | Karpen et al. | |
| 2004/0215413 A1 | 10/2004 | Weldum et al. | |
| 2004/0233318 A1 | 11/2004 | Schiefer | |
| 2005/0050707 A1 | 3/2005 | Scott et al. | |
| 2005/0129108 A1 | 6/2005 | Bendall et al. | |
| 2005/0162643 A1 | 7/2005 | Karpen | |
| 2005/0165275 A1 | 7/2005 | Von Felten et al. | |
| 2005/0168571 A1 | 8/2005 | Lia et al. | |
| 2005/0281520 A1 | 12/2005 | Kehoskie et al. | |
| 2006/0050983 A1 | 3/2006 | Bendall et al. | |
| 2006/0072903 A1 | 4/2006 | Weldum et al. | |
| 2006/0155168 A1 | 7/2006 | Pease | |
| 2006/0167340 A1 | 7/2006 | Pease et al. | |
| 2007/0030344 A1 | 2/2007 | Miyamoto et al. | |
| 2007/0046110 A1 | 3/2007 | Liu | |
| 2007/0070340 A1 | 3/2007 | Karpen | |
| 2007/0091183 A1 | 4/2007 | Bendall et al. | |
| 2007/0129604 A1 | 6/2007 | Hatcher et al. | |
| 2007/0156018 A1 | 7/2007 | Krauter et al. | |
| 2007/0156021 A1 | 7/2007 | Morse et al. | |
| 2007/0165306 A1 | 7/2007 | Bendall et al. | |
| 2007/0187574 A1 | 8/2007 | Lia | |
| 2007/0188604 A1 | 8/2007 | Miyamoto et al. | |
| 2007/0225561 A1 | 9/2007 | Watanabe et al. | |
| 2007/0225931 A1 | 9/2007 | Morse et al. | |
| 2007/0226258 A1 | 9/2007 | Lambdin et al. | |
| 2007/0249904 A1 | 10/2007 | Amano et al. | |
| 2007/0255100 A1 | 11/2007 | Barlow et al. | |
| 2008/0009677 A1 | 1/2008 | Shoroji et al. | |
| 2008/0021268 A1 | 1/2008 | Shoroji et al. | |

FOREIGN PATENT DOCUMENTS

WO    WO 2006/086106 A    8/2006

* cited by examiner

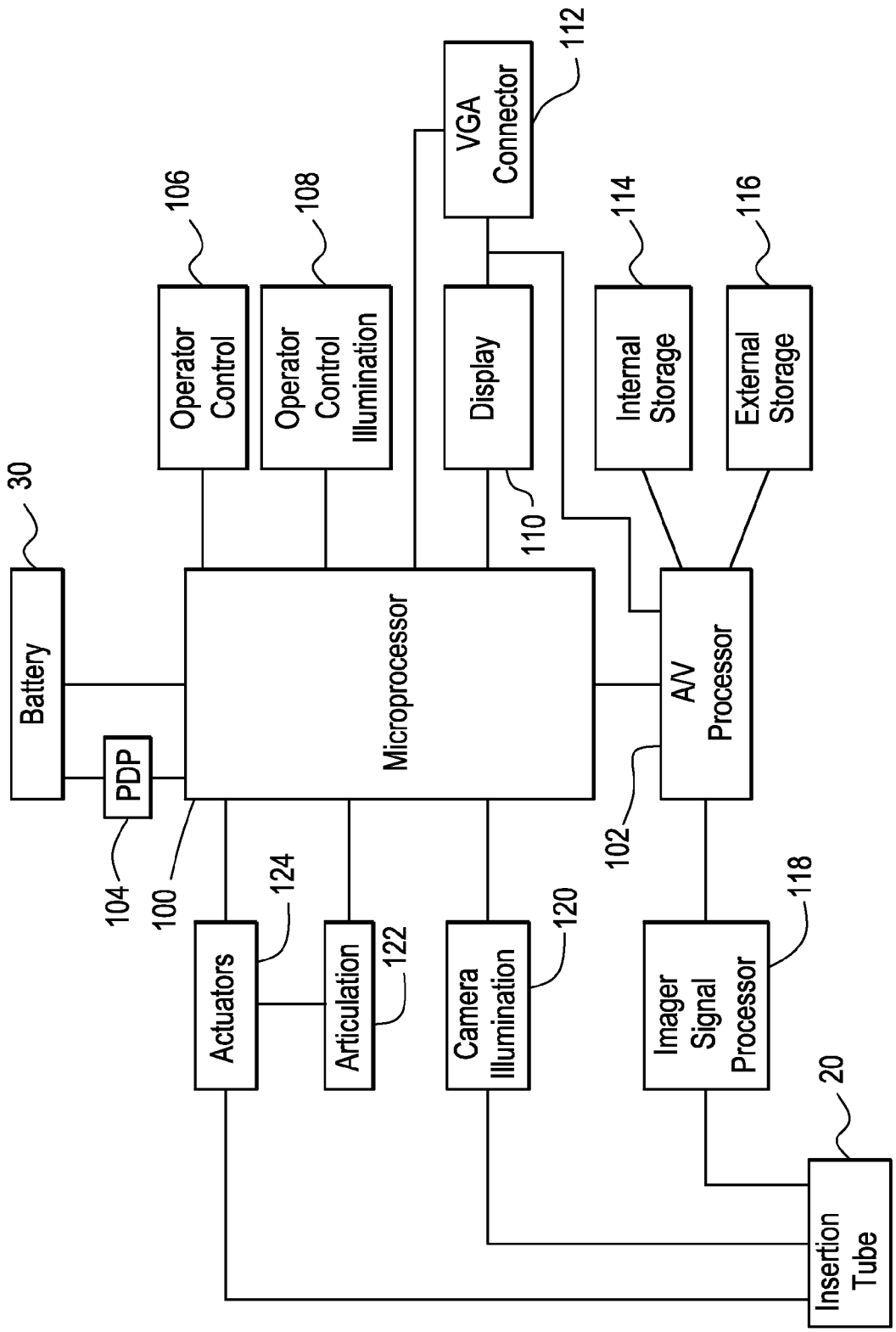

BATTERY AND POWER MANAGEMENT FOR INDUSTRIAL INSPECTION HANDSET

BACKGROUND OF THE INVENTION

This invention relates generally to an inspection apparatus and more particularly to a battery assembly and power management for an industrial inspection hansdset.

Industrial inspection apparatuses, such as endoscopes or borescopes, can include a handset tethered to a base unit by a cable or other connecting means. In this configuration, while it is the handset that actually conducts the inspection activities, it is the base unit that contains a significant amount of the hardware and processing capacity required by the industrial inspection apparatus. For example, the base unit could include the power supply and light sources required by the handset to conduct an inspection. A disadvantage of having the base unit supporting the operations of the handset is the limitation on the flexibility and portability of the person conducting the inspection with the handset, which must always remain tethered to the base unit, which, in turn, is often required to be connected to a source of electrical power.

A potential solution to the disadvantages of requiring a base unit is to relocate some or all of the hardware and processing capacity required by the industrial inspection apparatus from the base unit to the handset, thereby eliminating the need for a tethered connection between the two devices. For example, rather than having the power supply and light sources in the base unit, these devices can be provided in the handset. However, in order to maintain the portability of the handset, this power supply must take the form of a battery assembly that provides sufficient battery life for conducting an inspection without having to frequently recharge or replace the battery assembly. It would be advantageous to provide a handset having a battery assembly and power management to provide sufficient battery life for conducting an inspection.

BRIEF DESCRIPTION OF THE INVENTION

In one embodiment of the present invention, an industrial inspection handset is disclosed, comprising a battery assembly for providing power to the handset, wherein the battery assembly comprises a connector for connecting a battery charger, a battery circuit for communicating with a processor in the handset, and a battery charge indicator on the surface of the battery assembly connected to the battery circuit for providing a visual indication of the charge remaining in the battery assembly. A method of power management for an industrial inspection handset is also disclosed comprising the steps of setting a first maximum power output value for the camera illumination for the insertion, monitoring an imager signal processor, to determine that the gain value of the image signal processor is less than a predetermined gain value, and setting a lower second maximum power output value for the camera illumination in order to increase the gain value. Additional methods of power management for an industrial inspection handset are disclosed, comprising the steps of setting a first maximum power output value for the articulation of the insertion tube attached to the handset, monitoring the operator controls to determine that there has been no articulation for a first predetermined amount of time, monitoring the position of the insertion tube to determine whether the insertion tube position is inside or outside of a predetermined zone of coordinates, and reducing or turning off the articulation power to hold the position of the insertion tube.

BRIEF DESCRIPTION OF THE DRAWINGS

FIG. 5 is a block diagram of the electronics of the industrial inspection handset used for power management.

DETAILED DESCRIPTION OF THE INVENTION

Figure 1:
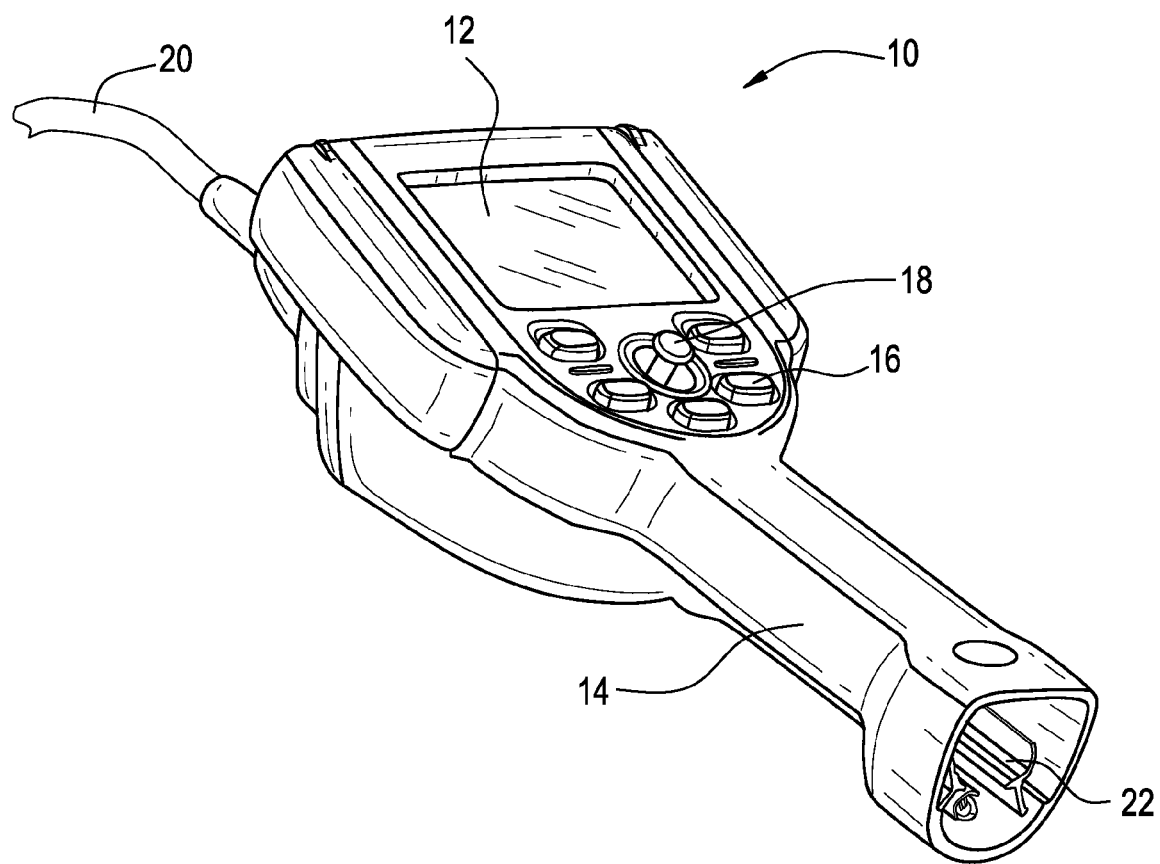
FIG. 1 is a perspective view of an industrial inspection handset without the battery assembly installed.

FIG. 1 illustrates an industrial inspection handset 10 made in accordance with the preferred embodiment of the invention. While FIG. 1 depicts the preferred embodiment of the present invention as an industrial video endoscope, the present invention is also applicable to other types of industrial inspectional apparatuses (e.g., other nondestructive testing devices using eddy current and ultrasonic techniques). The handset 10 of FIG. 1 includes a display 12 for providing visual information to the user, a handle 14 for receiving a battery assembly 30 (not shown), control buttons 16 and a control joystick 18 for operating the handset 10, and an insertion tube 20 for conducting a visual inspection of an object. In addition to the display 12, the handset 10 also can include an interface for connecting to an external display (e.g., VGA monitor) (not shown) during or after an inspection. The interior of the handle 14 includes guide rails 22 for receiving and holding the battery assembly 30 (not shown).

Figure 2:
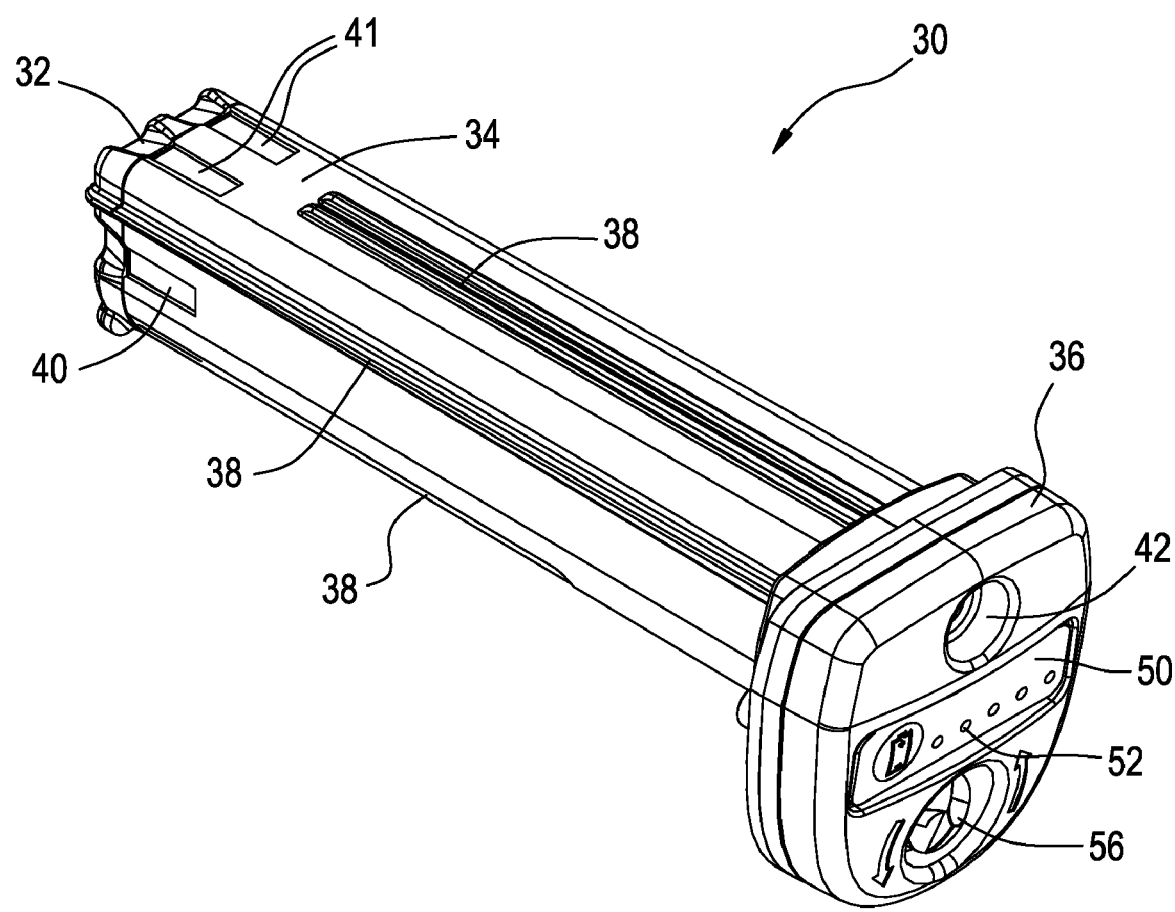
FIG. 2 is a perspective view of the battery assembly for the industrial inspection handset.
Figure 3:
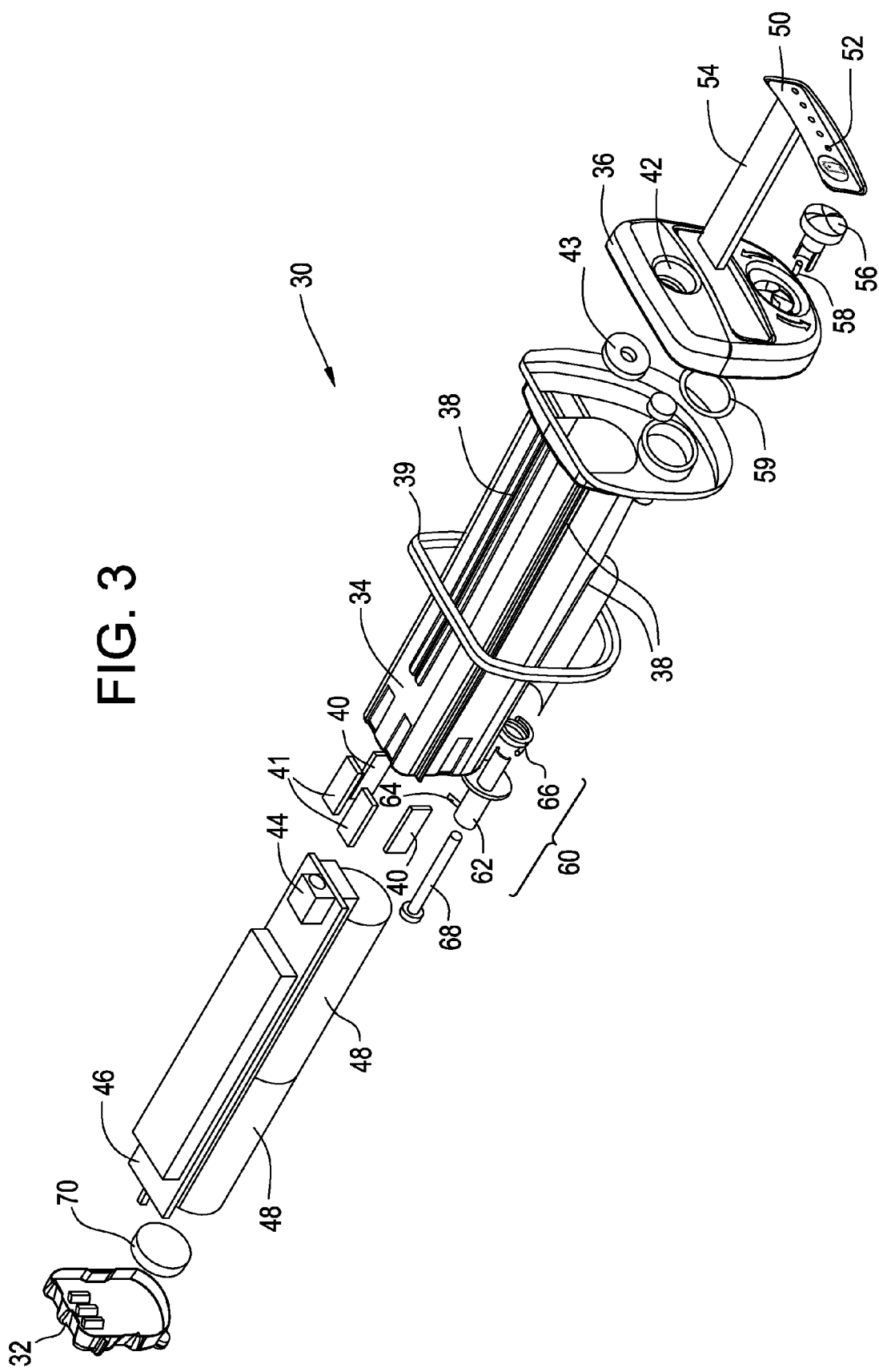
FIG. 3 is an exploded view of the battery assembly for the industrial inspection handset.
Figure 4:
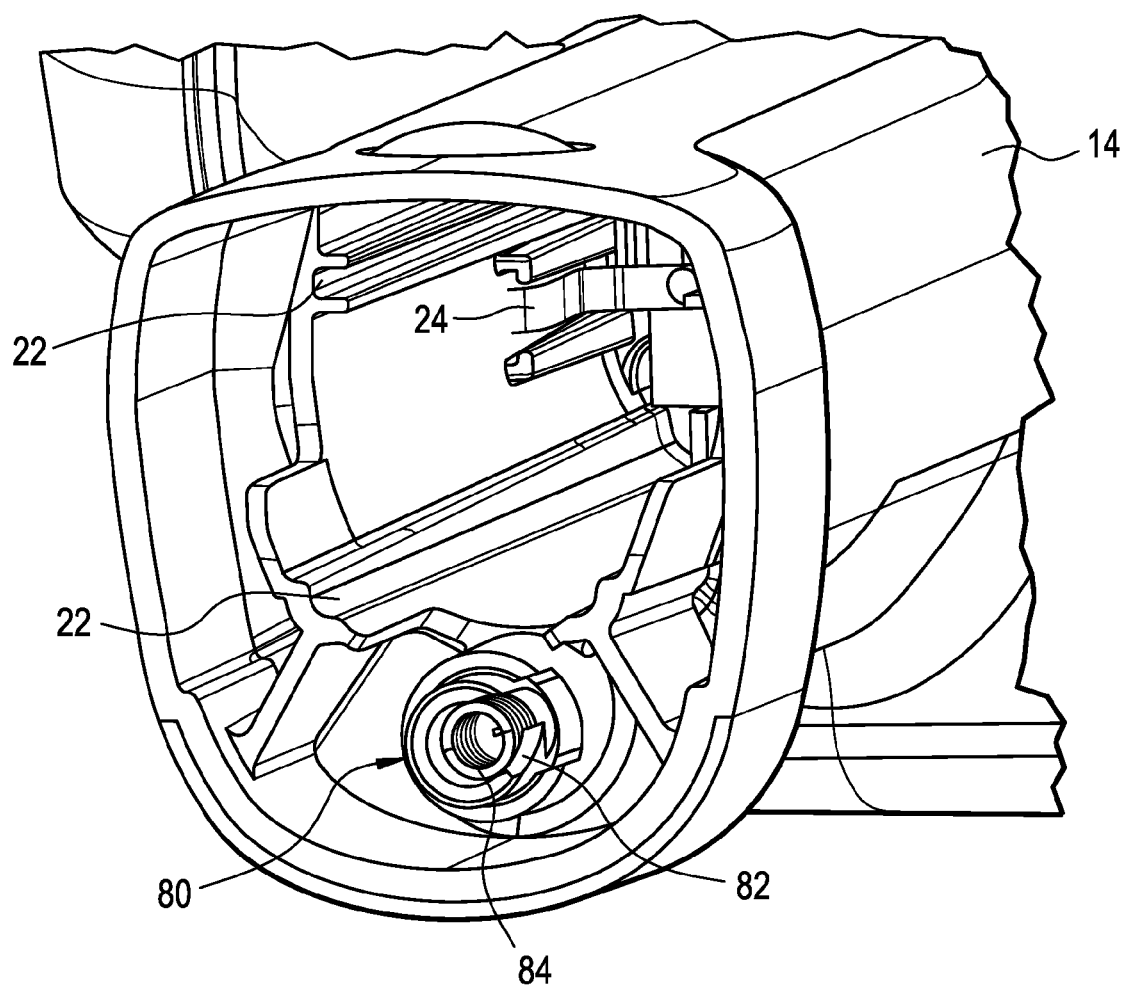
FIG. 4 is a perspective view of the interior of the handle of the industrial inspection handset without the battery assembly installed.

FIG. 2 illustrates a perspective view of the battery assembly 30 for the industrial inspection handset 10, while FIG. 3 illustrates an exploded view of the battery assembly 30. The battery assembly 30 of the preferred embodiment includes an outer shell consisting of a front cap 32, battery housing 34, and end cap 36 effectively containing the internal hardware of the assembly 30. An elastomeric gasket 39 surrounds the end of the battery housing 34 where the end cap 36 contacts the distal end of the handle 14 of the handset 10. This outer shell includes locating ribs 38 that line up and with the guide rails 22 as shown in FIG. 4 on the interior of the handle 14 of the handset 10 to slide the battery assembly 30 into and out of the handle 14. The outer shell is made of polycarbonate plastic to provide protection from drops and general abuse.

The battery assembly 30 includes a foam endcap 70 positioned between the front cap 32 and the battery cells 48. In the preferred embodiment, the battery cells 48 are two lithium ion batteries, but other battery types and quantities of cells may be used. The battery assembly 30 also includes battery power contacts 40 for providing an electrical connection between the battery circuit board 46 and the contacts 24 of the handset 10 as shown in FIG. 4. The battery assembly 30 also has battery communication contacts 41 that provide communication lines so that handset 10 can query the battery assembly 30 for, and display on the handset display 12, information regarding diagnostic data, temperature, remaining run time, charge progress, and maintenance data. The battery circuit board 46 provides the safety circuitry, the charge circuit, and the signal generation to communicate with the battery assembly 30.

The exterior surface of the end cap 36 includes an opening 42 for connecting to the DC connector 44 located on the battery circuit board 46. A seal 43 is provided behind the opening 42 to provide a moisture barrier. This DC connector 44 can be connected to a charger (not shown) attached to an AC outlet or 12V vehicle power to trickle charge the battery cells 48 during and after an inspection. If circumstances permit charging during an inspection (e.g., proximity to an AC outlet), this would allow for unlimited inspection time. The battery assembly 30 need not be installed in the handle 14 of the handset 10 to charge the battery cells 48.

The exterior surface of the end cap 36 also includes a battery charge indicator 50 containing LEDs 52 and connected by a membrane switch 54 to the battery circuit board 46 for providing a visual indication of the power level remaining in the battery assembly 30 as monitored by the battery circuit board 46. When a user wants to receive an indication of the remaining battery charge for the battery assembly 30, the user can depress the battery charge indicator 50, thereby depressing the membrane switch 54, which effectively requests that the battery circuit board 46 determine the remaining battery charge and illuminate the appropriate number of LEDs 52 in the battery charge indicator 50 to indicate remaining capacity. The battery charge indicator 50 can also indicate charging progress when the battery assembly 30 is being charged.

In the preferred embodiment, the exterior surface of the end cap 36 additionally includes a turn connector 56 (e.g., a quarter turn connector) for unlocking the battery assembly latching mechanism 60 that holds the battery assembly 30 within the handle 14 of the handset 10. The turn connector 56 can be operated by a coin or other suitable tool. A dowel pin 58 limits the rotation of the turn connector 56 in both the clockwise and counterclockwise directions An O-ring 59 is provided behind the turn connector 56 to provide a moisture barrier. The turn connector latching mechanism 60 includes a turn connector shaft 62 containing a short stub 64 extending perpendicularly from its surface, as well as a turn connector spring 66, which applies a clockwise force on the stub 64. The components of the turn connector latching mechanism 60 are held together by a screw 68 extending through all components.

As can be seen in FIG. 4, the interior of the handle 14 of the handset 10 includes a handset battery latching receiver 80 for receiving and holding the turn connector latching mechanism 60. When the battery assembly 30 is inserted into the handle 14 of the handset 10 to the position where the turn connector latching mechanism 60 contacts the ramped incline 82 of the handset battery latching receiver 80, the ramped incline 82 causes the turn connector shaft 62 and stub 64 to rotate in a counterclockwise fashion, against the force of the turn connector spring 66. When the battery assembly 30 is fully inserted into the handle 14 of the handset 10, the stub 64 of the turn connector shaft 62 goes beyond the ramped incline 82 of the handset battery latching receiver 80 and is held in place by the rear side of the ramped incline 82 of the handset battery latching receiver 80 and the turn connector spring 66. In this fully inserted position, elastomeric gasket 39 of the battery assembly provides a seal where the end cap 36 contacts the distal end of the handle 14 of the handset 10. At this point, the spring 84 of the battery latching receiver 80 applies pressure on the turn connector latching mechanism 60, trying to force the battery assembly 30 out of the handle 14. However, since the stub 64 of the turn connector shaft 62 is held in place by the rear side of the ramped incline 82 of the handset battery latching receiver 80 and the turn connector spring 66, only when the turn connector 56 is intentionally turned in a counterclockwise direction does the stub 64 get beyond the rear side of the ramped incline 82 in order to pop the battery assembly 30 out of the handle 14. This requirement avoids the inadvertent disconnection or removal of the battery assembly 30 from the handset 14.

In order to maximize potential inspection times using the untethered handset 10 powered by the battery assembly 30, the electronics within the handset 10 manage the power consumption from the battery assembly 30 in a number of ways. FIG. 5 is a block diagram of the electronics of the industrial inspection handset 10 used for power management. Each of the components of the handset 10 is powered by the battery assembly 30, which is connected to a power distribution point 104 to which all components are connected. The power management of the handset 10 is coordinated by the microprocessor 100 and the audio/visual (A/V) processor 102. As described below, one or both of these devices manage the power consumption of the handset 10 by monitoring and/or controlling the operations of the handset 10 components and connected devices, including the battery assembly 30, the power distribution point 104, the operator controls subsystem (or circuitry) 106, the operator controls illumination subsystem 108, the display subsystem 110, the VGA connector subsystem 112, internal storage, 114, external storage 116, the imager signal processor 118, the camera illumination subsystem 120, the articulation subsystem 122, and the actuators 124 that control the articulation cables of the insertion tube 20.

On powering up the handset 10, the microprocessor 100 establishes a normal power mode by communicating absolute maximum power output values to several of the handset components, including the operator controls illumination subsystem 108, the display subsystem 110, the camera illumination subsystem 120, and the articulation subsystem 122. The power output of these subsystems can be limited in a variety of ways, including the use of digital potentiometers, logic signals, or pulse width modulation techniques. As described below, these normal power output values can be reduced by the power management system or by user preferences through the use of screen 12 menus.

One way in which the handset 10 implements power management is by monitoring the idle time of the operator controls subsystem 106. The operator controls subsystem 106 provides the interface between the microprocessor 100 and the control buttons 16 and a control joystick 18 for operating the handset 10. The controls can be located on the handset 10 as shown in the preferred embodiment or remotely located (e.g., over a communications network). The microprocessor 100 monitors the status of the operator controls subsystem 106 for any user input (e.g., pressing a control button 16 that causes a change in logic levels or moving a control joystick 18 that causes a change in voltage). After each user input is received, the A/V processor 102 resets an idle time counter to begin tracking the time since there was any user input. If there is no user input after a first programmable predetermined amount of time (e.g., five minutes), the A/V processor 102 displays a message on the display 12 to alert the user and sends a message to the microprocessor 100 to go from normal power mode into idle power conservation mode. The microprocessor 100 establishes idle power conservation mode by communicating reduced maximum power output values to the operator controls illumination subsystem 108 (dimming the illumination of the control buttons 16), the display subsystem 110 (dimming the display 12), the camera illumination subsystem 120 (limiting the power output to the insertion tube 20 for illumination), and the articulation subsystem 122 (limiting the power available to control the movement of the insertion tube). If there is no user input after a second programmable predetermined amount of time (e.g., five minutes), the A/V processor 102 displays a message on the display 12 to alert the user and sends a message to the microprocessor 100 to go from idle power conservation mode into sleep mode. The microprocessor 100 establishes the sleep mode by communicating instructions to turn off the operator controls illumination subsystem 108, the display subsystem 110, the camera illumination subsystem 120, and the articulation subsystem 122. If there is no user input after a third programmable predetermined amount of time (e.g., five minutes), the A/V processor 102 displays a message on the display 12 to alert the user that the handset 10 will go from sleep mode into shutdown mode. In shutdown mode, the A/V processor 102 communicates with internal storage 114 (e.g., non-volatile flash memory such as a microSD Card) and external storage 116 (e.g., USB memory drive or network adaptor) to safely close and save data files in an orderly fashion. Once the files have been saved, the A/V processor 102 sends a message to the microprocessor 100 to go into shutdown mode by disconnecting the power to all handset 10 components connected to the power distribution point 104, including the electronics associated with the insertion tube 20.

When in idle power conservation mode or sleep mode, the handset 10 can be returned to normal power mode by manipulation of any of the operator interface controls, including pressing the control buttons 16 or moving the control joystick 18. Once in shutdown mode, however, the power key for the handset 10 must be used to return to normal power mode. Through the use of screen 12 menus, the user has the ability to disable idle power conservation mode and sleep mode entirely if it is desired to keep the handset 10 in normal power mode for the entire inspection regardless of periods of inactivity.

The microprocessor 100 also monitors the VGA connector subsystem 112, which generates the VGA output, to determine if there is any VGA monitor connected. If the microprocessor 100 determines that there is no VGA monitor connected, it communicates an instruction to turn off the VGA connector subsystem 112.

In addition to monitoring the activity or inactivity of the operator controls subsystem 106 and the VGA connector subsystem 112, the microprocessor 100 also monitors the remaining charge or battery life of the battery assembly 30 through the communication contacts 41 of the battery assembly 30. Regardless of user activity/inactivity or preferences, if the microprocessor 100 determines that there is close to a fully discharged condition (e.g., less than seven minutes of runtime), the microprocessor 100 instructs the A/V processor 102 to display a message on the display 12 to alert the user to the limited battery life and that the handset will go into discharge power conservation mode. As in the case of prolonged inactivity described previously, the microprocessor 100 establishes the discharge power conservation mode by communicating reduced maximum power output values to the operator controls illumination subsystem 108 (dimming the illumination of the control buttons 16), the display subsystem 110 (dimming the display 12), the camera illumination subsystem 120 (limiting the power output to the insertion tube 20 for illumination), and the articulation subsystem 122 (limiting the power available to control the movement of the insertion tube 20). If the microprocessor 100 monitoring the remaining charge of the battery assembly 30 determines that there is almost a fully discharged condition (e.g., less than one minute of runtime), the microprocessor 100 instructs the A/V processor 102 to display a message on the display 12 to alert the user to the limited battery life and that the handset 10 will go into shutdown mode. As in the case of prolonged inactivity described previously, in shutdown mode, the A/V processor 102 communicates with internal storage 114 (e.g., non-volatile flash memory such as a microSD Card) and external storage 116 (e.g., USB memory drive or network adaptor) to safely close and save data files in an orderly fashion.

Since the camera illumination subsystem 120, which includes the light source for the camera of the insertion tube 20, draws a significant amount of the power of the handset 10, special attention is paid to minimizing the power required for this function. For example, if the user is not viewing live video, but instead is operating the handset in non-live video mode (e.g., viewing or playing back previously recorded data or operating menu screens on the display 12), the A/V processor communicates a message to the microprocessor that live video is not required, after which the microprocessor 100 communicates an instruction to turn off the camera illumination subsystem 120. The microprocessor 100 also monitors the imager signal processor 118 to determine the amount of light required for an optimal image without wasting any light. One of the functions of the image signal processor 118 is to set the necessary gain or amplification of the image signal from the camera imager in the insertion tube 20 to produce an optimal image before transmission to the A/V processor 102. As a general matter, if there is less lighting provided than is required for an optimal image, the gain of the image signal processor 118 is higher than if there is more lighting than is required for an optimal image. The microprocessor 100 continuously monitors the gain value of the image signal processor 118, and if the gain value is lower than a predetermined gain value that will produce an optimal image (i.e., there is too much light), the microprocessor 100 communicates an instruction to reduce the maximum power output of the camera illumination subsystem 120.

A significant amount of power is also drawn by the articulation subsystem 122 and associated X and Y actuators (e.g., motors) 124, which control the articulation cables of the insertion tube 20 in the X and Y directions respectively. As described previously, depending on what power mode the handset 10 is in (e.g., a normal power mode or discharge power consumption mode), the microprocessor 100 communicates a predetermined maximum power output value to the articulation subsystem 122. When the user operates the control joystick 18 to move the insertion tube 20, the articulation subsystem 122 provides the allotted predetermined maximum power to move the insertion tube 20 to the desired (X, Y) position. After control joystick 18 comes to rest, the microprocessor 100 resets a counter to begin tracking the time since there was any articulation of the insertion tube 20. Since the force and associated power to hold the insertion tube 20 in place is significantly less than the force or power required to move the insertion tube 20, if there is no articulation after a programmable predetermined amount of time (e.g., five seconds), the microprocessor 100 begins a process to conserve power while the insertion tube 20 is stationary.

First, since the force and associated power to hold an insertion 20 in place depends on how far from a straight position the insertion tube 20 has been articulated (i.e., an insertion tube 20 position relatively close to the straight position requires less power to hold than a position 180° from the straight position), the microprocessor 100 determines the position (X, Y) of the insertion tube 20 based on the actuators 124. Second, once the position (X, Y) of the insertion tube 20 is known, the microprocessor 100 determines whether that position is inside or outside of a particular zone of (X, Y) coordinates encompassing insertion tube 20 positions not far from the straight position. If the insertion tube 20 position (X, Y) is outside of this zone, the microprocessor 100 communicates the reduced power output value required to hold that position to the articulation subsystem 122. If the insertion tube 20 position (X,Y) is inside of this zone, the insertion tube 20 can be held in position largely by the friction inherent in the system. Accordingly, the microprocessor 100 communicates an instruction to turn off the articulation subsystem 122. In addition, the microprocessor 100 also creates a short circuit across each of the X, Y actuators 124. These short circuits, which can be formed by driving a MOSFET across each of the actuator motors, causes the motors to operate as a generators creating mechanical resistance to resist any movement by the insertion tube 20. These same power saving steps are taken when the handset 10 is operated in non-live video mode (e.g., viewing or playing back previously recorded data or operating menu screens on the display 12). Regardless of whether the insertion tube 20 is outside or inside the zone, when the user moves the control joystick 18 to move the insertion tube 20, depending on what power mode the handset 10 is in (e.g., a normal power mode or discharge power consumption mode), the microprocessor 100 communicates a predetermined maximum power output value to the articulation subsystem 122 to allow movement.

In addition to the automatic power management monitoring conducted by the microprocessor 100 and A/V processor 102, the handset 10 also provides the ability to manage power consumption based on user preferences. For example, through the use of screen 12 menus, the user can select a reduced amount of camera illumination for the insertion tube 20, which causes the microprocessor 100 to communicate the selected maximum power output value to the camera illumination subsystem 120. Similarly, the user can select a reduced amount of backlighting for the display 12, which causes the microprocessor 100 to communicate the selected maximum power output value to the operator controls illumination subsystem 108.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An industrial inspection handset comprising:
a display for providing visual information to a user;
a control module for operating said handset;
a battery assembly for providing power to said handset;
a handle for receiving said battery assembly; and
a processor;
wherein said processor sets a first maximum power output value for a camera illumination of an insertion tube attached to said handset, monitors an imager signal processor which receives images from said insertion tube to determine whether the gain value of said image signal processor is less than a predetermined gain value, and sets a second maximum power output value, which is less than said first maximum power output value, for said camera illumination when said gain value of said image signal processor is less than a predetermined gain value in order to increase said gain value of said image signal processor to predetermined gain value; and
wherein said battery assembly comprises
at least one battery cell;
a connector for connecting a battery charger to charge said at least one battery cell;
a battery circuit for communicating with said processor in said handset, wherein said processor monitors information about said battery assembly; and
a battery charge indicator on the surface of said battery assembly connected to said battery circuit for providing a visual indication of the charge remaining in said battery assembly.

2. The industrial inspection handset of claim 1, wherein said at least one battery cell is a lithium ion battery.

3. The industrial inspection handset of claim 1, wherein said connector is a DC connector.

4. The industrial inspection handset of claim 1, wherein said battery charge indicator comprises a membrane switch.

5. The industrial inspection handset of claim 1, wherein said battery charge indicator comprises a plurality of LEDs for providing said visual indication of the charge remaining in said battery assembly.

6. The industrial inspection handset of claim 1, wherein said battery assembly further comprises a spring-based latching member operated by a turn connector for interfacing with a spring-based receiving member of said handset handle for receiving and holding said battery assembly.

7. The industrial inspection handset of claim 1, wherein said battery assembly further comprises a sealing member for providing a seal with said handset handle when said battery assembly is fully inserted in said handle.

8. The industrial inspection handset of claim 1, wherein said handset is not connected to a base unit.

9. An industrial inspection handset comprising:
a display for providing visual information to a user;
a control module for operating said handset;
a battery assembly for providing power to said handset;
a handle for receiving said battery assembly; and
a processor;
wherein said processor sets a first maximum power output value for the articulation of an insertion tube attached to said handset, wherein the movement of said insertion tube is operated by a plurality of actuators, monitors one or more operator controls to determine that there has been no articulation for a first predetermined amount of time, monitors the position of said insertion tube to determine that said insertion tube position is outside of a predetermined zone of coordinates, and sets a second maximum power output value, which is less than said first maximum power output value, for said articulation sufficient to hold said insertion tube in place; and
wherein said battery assembly comprises
at least one battery cell;
a connector for connecting a battery charger to charge said at least one battery cell;
a battery circuit for communicating with said processor in said handset, wherein said processor monitors information about said battery assembly; and
a battery charge indicator on the surface of said battery assembly connected to said battery circuit for providing a visual indication of the charge remaining in said battery assembly.

10. The industrial inspection handset of claim 9, wherein said battery charge indicator comprises a membrane switch.

11. The industrial inspection handset of claim 9, wherein said battery charge indicator comprises a plurality of LEDs for providing said visual indication of the charge remaining in said battery assembly.

12. The industrial inspection handset of claim 9, wherein said battery assembly further comprises a spring-based latching member operated by a turn connector for interfacing with a spring-based receiving member of said handset handle for receiving and holding said battery assembly.

13. The industrial inspection handset of claim 9, wherein said battery assembly further comprises a sealing member for providing a seal with said handset handle when said battery assembly is fully inserted in said handle.

14. The industrial inspection handset of claim 9, wherein said handset is not connected to a base unit.

15. An industrial inspection handset comprising:
  a display for providing visual information to a user;
  a control module for operating said handset;
  a battery assembly for providing power to said handset;
  a handle for receiving said battery assembly; and
  a processor;
  wherein said processor sets a first maximum power output value for the articulation of an insertion tube attached to said handset, wherein the movement of said insertion tube is operated by a plurality of actuators, monitors one or more operator controls to determine that there has been no articulation for a first predetermined amount of time, monitors the position of said insertion tube to determine that said insertion tube position is inside of a predetermined zone of coordinates, and turns off power for said articulation; and
  wherein said battery assembly comprises
  at least one battery cell;
  a connector for connecting a battery charger to charge said at least one battery cell;
  a battery circuit for communicating with said processor in said handset, wherein said processor monitors information about said battery assembly; and
  a battery charge indicator on the surface of said battery assembly connected to said battery circuit for providing a visual indication of the charge remaining in said battery assembly.

16. The industrial inspection handset of claim 15, wherein said battery charge indicator comprises a membrane switch.

17. The industrial inspection handset of claim 15, wherein said battery charge indicator comprises a plurality of LEDs for providing said visual indication of the charge remaining in said battery assembly.

18. The industrial inspection handset of claim 15, wherein said battery assembly further comprises a spring-based latching member operated by a turn connector for interfacing with a spring-based receiving member of said handset handle for receiving and holding said battery assembly.

19. The industrial inspection handset of claim 15, wherein said battery assembly further comprises a sealing member for providing a seal with said handset handle when said battery assembly is fully inserted in said handle.

20. The industrial inspection handset of claim 15, wherein said handset is not connected to a base unit.

\* \* \* \* \*

UNITED STATES PATENT AND TRADEMARK OFFICE
CERTIFICATE OF CORRECTION

PATENT NO.         : 7,902,990 B2             Page 1 of 1
APPLICATION NO.    : 11/925056
DATED              : March 8, 2011
INVENTOR(S)        : James J. Delmonico It is certified that error appears in the above-identified patent and that said Letters Patent is hereby corrected as shown below:

Col. 1, Line 3 insert

--This invention was made with Government support under Contract No. N68335-06-C-0341 awarded by the Department of the Navy. The Government has certain rights in this invention.--

Signed and Sealed this
Nineteenth Day of February, 2013

Teresa Stanek Rea
*Acting Director of the United States Patent and Trademark Office*